(12) United States Patent
Cheong et al.

(10) Patent No.: US 6,473,850 B1
(45) Date of Patent: Oct. 29, 2002

(54) SYSTEM AND METHOD FOR HANDLING INSTRUCTIONS OCCURRING AFTER AN ISYNC INSTRUCTION

(75) Inventors: Hoichi Cheong; R. William Hay; James Allan Kahle; Hung Qui Le, all of Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/389,197

(22) Filed: Sep. 2, 1999

(51) Int. Cl.[7] .................................................. G06F 9/38
(52) U.S. Cl. ...................................... 712/244; 712/228
(58) Field of Search ................................. 712/244, 228

(56) References Cited

U.S. PATENT DOCUMENTS

| | | | | |
|---|---|---|---|---|
| 5,495,590 A | * | 2/1996 | Comfort et al. | 712/228 |
| 5,666,506 A | * | 9/1997 | Hesson et al. | 712/216 |
| 5,996,085 A | * | 11/1999 | Cheong et al. | 713/400 |
| 6,295,601 B1 | * | 9/2001 | Steele, Jr. | 712/244 |

* cited by examiner

Primary Examiner—Richard L. Ellis
(74) Attorney, Agent, or Firm—Kelly K. Kordzik; Winstead Sechrest & Minick P.C.; Anthony V. S. England

(57) ABSTRACT

An ISYNC instruction does not cause a flush of speculatively dispatched or fetched instructions (instructions that are dispatched or fetched after the ISYNC instruction) unconditionally. The present invention detects the occurrence of any instruction that changes the state of the machine and requires a context synchronizing complete; these instructions are called context-synchronizing-required instructions. When a context-synchronizing-required instruction completes, the present invention sets a flag to note the occurrence of that condition. When an ISYNC instruction completes, the present invention causes a flush and refetches the instruction after the ISYNC if the context-synchronizing-required flag is active. The present invention then resets the context-synchronizing-required flag. If the context-synchronizing-required flag is not active, then the present invention does not generate a flush operation.

18 Claims, 3 Drawing Sheets

SYSTEM AND METHOD FOR HANDLING INSTRUCTIONS OCCURRING AFTER AN ISYNC INSTRUCTION

CROSS-REFERENCE TO RELATED APPLICATIONS

This patent application is related to U.S. patent application Ser. No. 08/893,070, filed Jul. 15, 1997, which is hereby incorporated by reference herein.

TECHNICAL FIELD

The present invention relates in general to data processing systems, and in particular, to the execution of machine context synchronization operations.

BACKGROUND INFORMATION

Within certain processor architectures, memory synchronization instructions control the order in which memory operations are completed with respect to asynchronous events, and the order in which memory operations are seen by other processors or memory access mechanisms. An instruction synchronize (ISYNC) instruction causes the processor to discard all prefetched instructions, wait for any preceding instructions to complete, and then branch to the next sequential instruction (which has the effect of clearing the pipeline behind the ISYNC instruction). For further discussion of the ISYNC instruction, refer to "*PowerPC 603 RISC Microprocessor User's Manual*, Copyright 1994, Motorola, Inc. and International Business Machines Corp.", pp. 4–71, 4–72, 5–24 and 11–83, and "*PowerPC System Architecture*, Tom Shanley, Copyright 1995 by MindShare, Inc.", p. 113, which are hereby incorporated by reference herein.

Prior art processors unconditionally flushed all speculative instructions that were dispatched or fetched after an ISYNC instruction. "Flush" refers to the clearing of the processor of instructions. This unconditional flush action resulted in flushing and restarting the instruction stream several times for every one thousand instructions. The more speculative the design allows, the more performance loss this flush action caused. Furthermore, such flush actions can result in an average of over a dozen cycles in penalty for subsequently re-retrieving the instructions.

The ISYNC instruction is often used as a barrier in lock sequences. One example is illustrated below using PowerPC instructions.

| loop: | larwx | # load and reserve instruction |
|---|---|---|
| | ... | |
| | stcwx | # store conditional |
| | bne loop | # branch if condition code not = 1 to loop |
| | isync | |
| | ... | |
| | ld | # subsequent load |

In this example, a critical section is protected and a process can enter only if it obtains a lock. The larwx instruction establishes a reservation (the lock to the critical section), the stcwx instruction checks if the reservation is obtained, the bne instruction branches back to the larwx instruction if the reservation is not obtained. If the reservation is obtained, the branch will be unsuccessful and this process is allowed to proceed by executing the isync and subsequent instructions, which include a ld instruction. The isync is needed to ensure that the ld instruction can only be executed after the larwx instruction has executed completely (its data has been fetched and returned). Prior implementation of the isync cause a flush and refetch of the instruction after the isync thus ensuring that the ld instruction will execute after the larwx instruction.

This type of usage is implemented often, and removing the flush penalty can improve the performance of the processor. Therefore, there is a need in the art for improving upon the flush penalty associated with the execution of ISYNC instructions.

SUMMARY OF THE INVENTION

In the present invention, an ISYNC instruction does not cause a flush of speculatively dispatched or fetched instructions (instructions that are dispatched or fetched after the ISYNC instruction) unconditionally. The present invention detects the occurrence of any instruction that changes the state of the machine and requires a context synchronizing complete; these instructions are called context-synchronizing-required instructions. When a context-synchronizing-required instruction completes, the present invention sets a flag to note the occurrence of that condition; this flag is referred to as a context-synchronizing-required flag. When an ISYNC instruction completes afterward, the present invention causes a flush and refetches the instructions after the ISYNC if the context-synchronizing-required flag is active. The present invention then resets the context-synchronizing-required flag. If the context-synchronizing-required flag is not active, then the present invention does not generate a flush operation. The present invention thus reduces the frequency of the flush action significantly, thus improving the performance of the processor.

Furthermore, the context-synchronizing-required flag is not set when the context-synchronizing-required instruction is dispatched. Instead, the flag is set when the corresponding instruction completes. This implementation solves the problem of speculative context-synchronizing-required instructions setting the context-synchronizing-required flag and then aborting.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
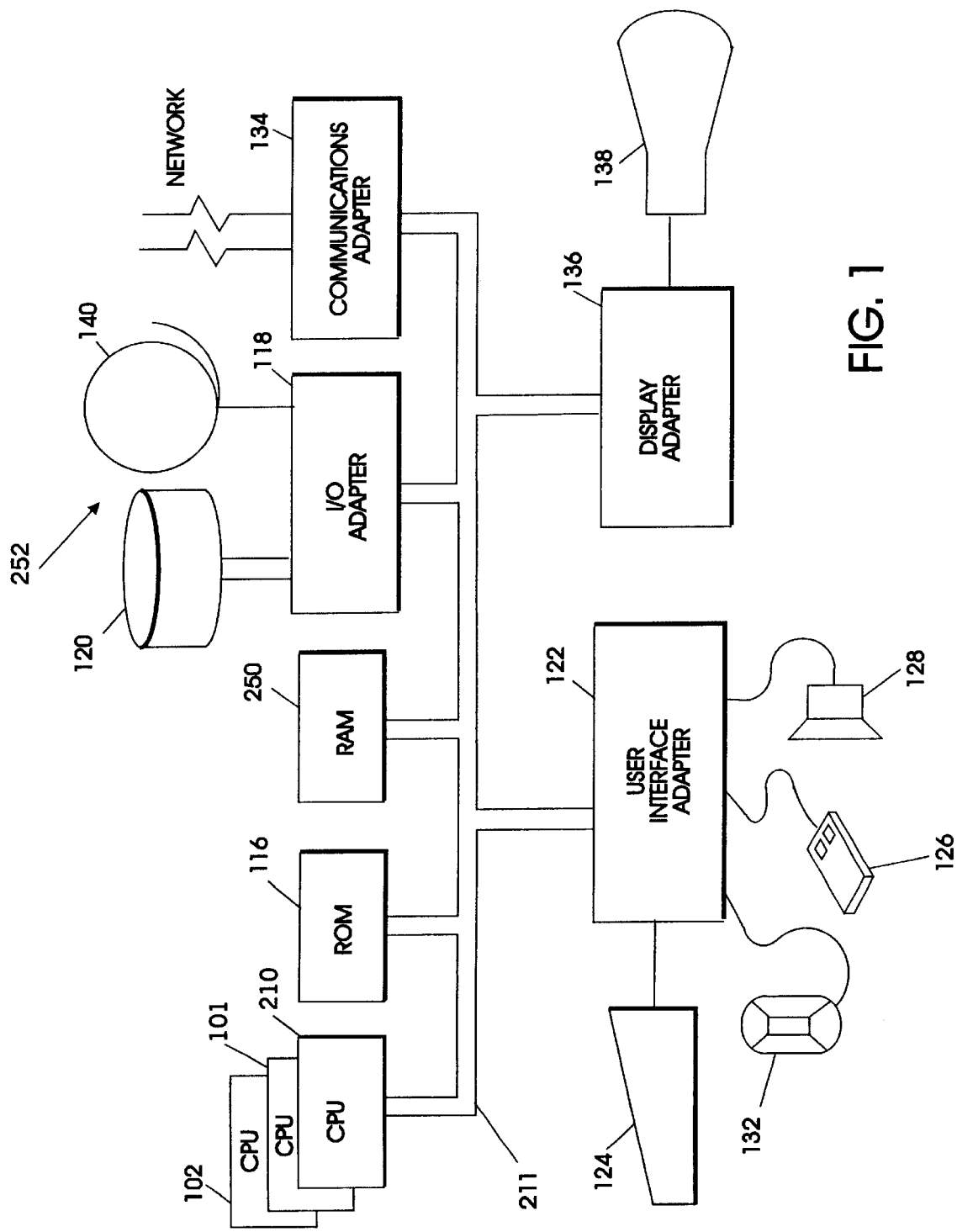
FIG. 1 illustrates a data processing system configurable in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring first to FIG. 1, an example is shown of a data processing system configurable in accordance with the present invention. The system has a central processing unit ("CPU") 210, such as a PowerPC microprocessor ("PowerPC" is a trademark of IBM Corporation) according to the "*PowerPC Architecture: A Specification for a New Family of RISC Processors*," 2d edition, 1994, Cathy May, et al. Ed., which is hereby incorporated by reference herein. A more specific implementation of a PowerPC microprocessor is described in the "*PowerPC 604 RISC Microprocessor User's Manual*," 1994, IBM Corporation, which is hereby incorporated by reference herein.

The CPU 210 is coupled to various other components by system bus 211. Read only memory ("ROM") 116 is coupled to the system bus 211 and includes a basic input/output system ("BIOS"), which controls certain basic functions of the data processing system. Random access memory ("RAM") 250, I/O adapter 118, and communications adapter 134 are also coupled to the system bus 211. I/O adapter 118 may be a small computer system interface ("SCSI") adapter that communicates with a disk storage device 120 or tape storage drive 140. I/O adapter 118, disk storage device 120, and tape storage device 140 are also referred to herein as mass storage 252. Communications adapter 134 interconnects bus 211 with an outside network enabling the data processing system to communicate with other such systems. Input/output devices are also connected to system bus 211 via user interface adapter 122 and display adapter 136. Keyboard 124, trackball 132, mouse 126, and speaker 128 are all interconnected to bus 211 via user interface adapter 122. Display monitor 138 is connected to system bus 211 by display adapter 136. In this manner, a user is capable of inputting to the system through the keyboard 124, trackball 132, or mouse 126 and receiving output from the system via speaker 128 and display 138. Additionally, an operating system such as AIX ("AIX" is a trademark of the IBM Corporation) is used to coordinate the functions of the various components shown in FIG. 1.

It should be noted that the data processing system configured in accordance with the present invention may be a multi-processing system including processors 101 and 102, in addition to processor 210, coupled to system bus 211.

Figure 2:
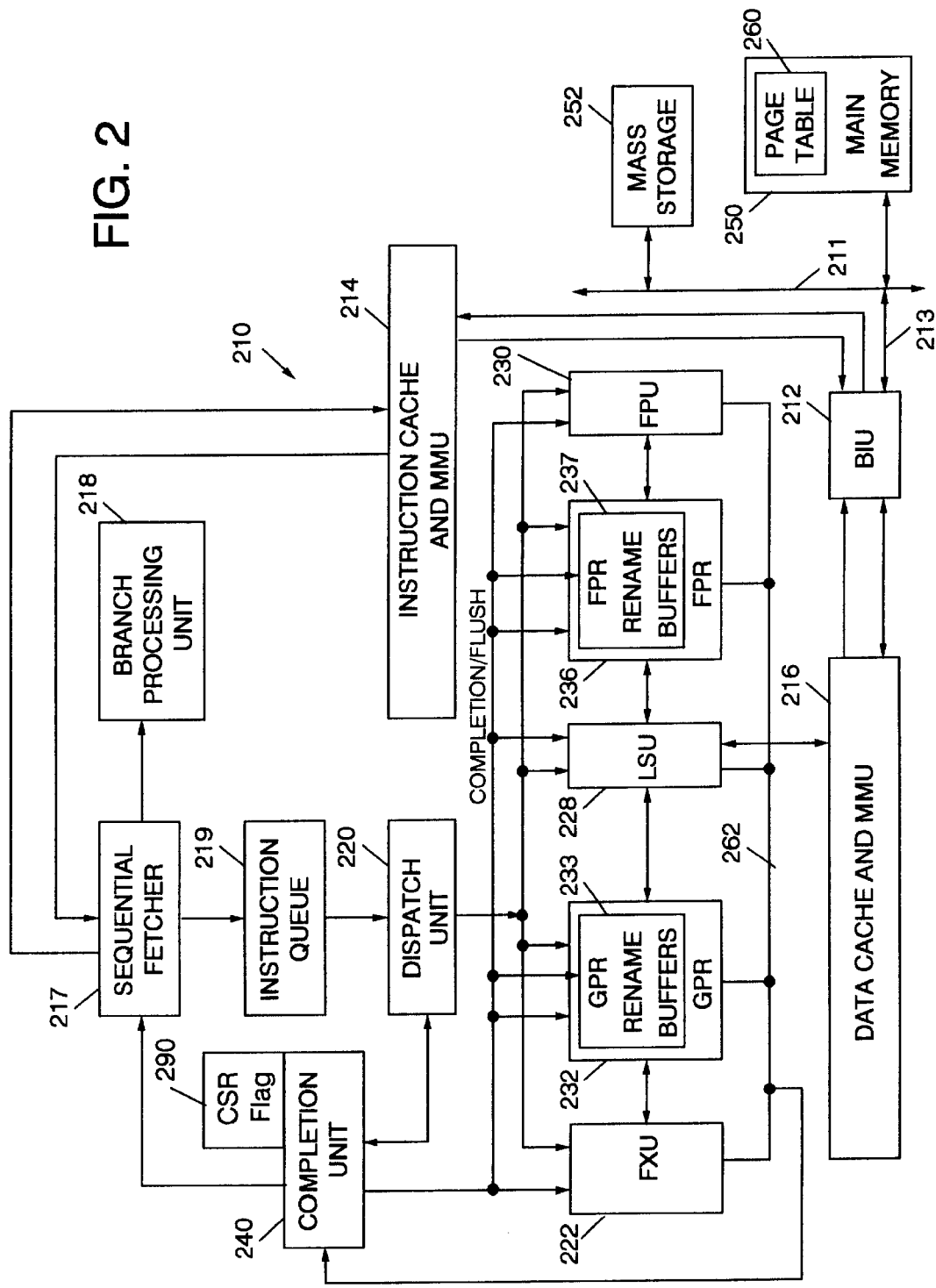
FIG. 2 illustrates a processor configurable in accordance with the present invention.

With reference now to FIG. 2, there is depicted a block diagram of an illustrative embodiment of a data processing system for processing information in accordance with the invention recited within the appended claims. In the depicted illustrative embodiment, CPU 210 comprises a single integrated circuit superscalar microprocessor. Accordingly, as discussed further below, CPU 210 includes various execution units, registers, buffers, memories, and other functional units, which are all formed by integrated circuitry. CPU 210 is coupled to system bus 211 via bus interface unit (BIU) 212 and processor bus 213, which like system bus 211 includes address, data, and control buses. BIU 212 controls the transfer of information between processor 210 and other devices coupled to system bus 211, such as main memory (RAM) 250 and nonvolatile mass storage 252, by participating in bus arbitration. The data processing system illustrated in FIG. 2 may include other unillustrated devices coupled to system bus 211, which are not necessary for an understanding of the following description and are accordingly omitted for the sake of simplicity.

BIU 212 is connected to instruction cache and MMU (Memory Management Unit) 214 and data cache and MMU 216 within CPU 210. High-speed caches, such as those within instruction cache and MMU 214 and data cache and MMU 216, enable CPU 210 to achieve relatively fast access times to a subset of data or instructions previously transferred from main memory 250 to the caches, thus improving the speed of operation of the data processing system. Data and instructions stored within the data cache and instruction cache, respectively, are identified and accessed by address tags, which each comprise a selected number of high-order bits of the physical address of the data or instructions in main memory 250. Instruction cache and MMU 214 is further coupled to sequential fetcher 217, which fetches instructions for execution from instruction cache and MMU 214 during each cycle. Sequential fetcher 217 transmits branch instructions fetched from instruction cache and MMU 214 to branch processing unit ("BPU") 218 for execution, but temporarily stores sequential instructions within instruction queue 219 for execution by other execution circuitry within CPU 210.

In the depicted illustrative embodiment, in addition to BPU 218, the execution circuitry of CPU 210 comprises multiple execution units for executing sequential instructions, including fixed-point unit ("FXU") 222, load/store unit ("LSU") 228, and floating-point unit ("FPU") 230. Each of execution units 222, 228 and 230 typically executes one or more instructions of a particular type of sequential instructions during each processor cycle. For example, FXU 222 performs fixed-point mathematical and logical operations such as addition, subtraction, ANDing, ORing, and XORing, utilizing source operands received from specified general purpose registers ("GPRs") 232. Following the execution of a fixed-point instruction, FXU 222 outputs the data results of the instruction to GPR buffers 232, which provide storage for the result received on result bus 262. Conversely, FPU 230 typically performs single and double-precision floating-point arithmetic and logical operations, such as floating-point multiplication and division, on source operands received from floating-point registers ("FPRs") 236. FPU 230 outputs data resulting from the execution of floating-point instructions to selected FPR buffers 236, which store the result data. As its name implies, LSU 228 typically executes floating-point and fixed-point instructions which either load data from memory (i.e., either the data cache within data cache and MMU 216 or main memory 250) into selected GPRs 232 or FPRs 236 or which store data from a selected one of GPRs 232 or FPRs 236 to memory 250.

CPU 210 employs both pipelining and out-of-order execution of instructions to further improve the performance of its superscalar architecture. Accordingly, instructions can be executed by FXU 222, LSU 228, and FPU 230 in any order as long as data dependencies are observed. In addition, instructions are processed by each of FXU 222, LSU 228, and FPU 230 at a sequence of pipeline stages. As is typical of high-performance processors, each sequential instruction is processed at five distinct pipeline stages, namely, fetch, decode/dispatch, execute, finish, and completion.

During the fetch stage, sequential fetcher 217 retrieves one or more instructions associated with one or more memory addresses from instruction cache and MMU 214. Sequential instructions fetched from instruction cache and MMU 214 are stored by sequential fetcher 1217 within instruction queue 219. In contrast, sequential fetcher 217 removes (folds out) branch instructions from the instruction stream and forwards them to BPU 218 for execution. BPU 218 includes a branch prediction mechanism, which in one embodiment comprises a dynamic prediction mechanism such as a branch history table. That enables BPU 218 to speculatively execute unresolved conditional branch instructions by predicting whether or not the branch will be taken.

During the decode/dispatch stage, dispatch unit 220 decodes and dispatches one or more instructions from instruction queue 219 to execution units 222, 228, and 230, typically in program order. In a more conventional processor, dispatch unit 220 allocates a rename buffer within GPR rename buffers 233 or FPR rename buffers 237 for each dispatched instruction's result data, and at dispatch, instructions are also stored within the multiple-slot completion buffer of completion unit 240 to await completion. However, the present invention is adaptable to embodiments which require neither rename registers or completion units. According to the depicted illustrative embodiment, CPU 210 tracks the program order of the dispatched instructions during out-of-order execution utilizing unique instruction identifiers.

During the execute stage, execution units 222, 228, and 230 execute instructions received from dispatch unit 220 opportunistically as operands and execution resources for the indicated operations become available. In one embodiment, each of execution units 222, 228, and 230 are equipped with a reservation station that stores instructions dispatched to that execution unit until operands or execution resources become available. After execution of an instruction has terminated, execution units 222, 228, and 230 store data results, if any, within either GPRs or FPRs, depending upon the instruction type. In more conventional processors, execution units 222, 228, and 230 notify completion unit 240 which instructions have finished execution. Finally, instructions are completed in program order out of the completion buffer of completion unit 240. Instructions executed by FXU 222 and FPU 230 are completed by transferring data results of the instructions from GPR rename buffers 233 and FPR rename buffers 237 to GPRs 232 and FPRs 236, respectively.

However, in various embodiments, the invention utilizes the dispatch logic of the processor to "tokenize" a classical Von Neumann instruction stream into a data flow-style format. Thus, data dependencies are not handled by tracking the storage location of source data required by each instruction, as in register renaming, but rather by associating with an instruction certain information which enables tracking source data by reference to another instruction which is to provide the source data. Accordingly, the processor is provided with an instruction tag ("ITAG") generator which generates tokens, or tags, each of which is uniquely associated with an instruction upon dispatch. The ITAGs are used to retain program order information.

The dispatch unit 220 in the present invention not only assigns ITAGs and dispatches instructions, but also updates various tables which are used to track the status of the dispatched instructions.

Completion unit 240 includes a Group Completion Table ("GCT"), which is a first-in-first-out buffer that saves relevant information of interruptible instructions that have been dispatched but not yet completed. The interruptible instructions are instructions whose execution may cause (1) the re-dispatch of subsequent instructions that have already been dispatched, or (2) the abandonment of subsequent instructions that have already been dispatched. The CSI instructions fall into this category. Therefore, all CSI instructions are qualified for the GCT.

When the execution of an interruptible instruction causes redispatch and abandonment of subsequent instructions, then its execution "flushes" the subsequent instructions.

In prior art processors, an unconditional flush of all speculative instructions that were dispatched or fetched after an ISYNC instruction was performed. In the present invention, an ISYNC instruction does not cause a flush of speculatively dispatched or fetched instructions (instructions that are dispatched or fetched after the ISYNC instruction) unconditionally. The present invention detects the occurrence of any instruction that changes the state of the machine and requires a context synchronizing complete; these instructions are called context-synchronizing-required instructions. When a context-synchronizing-required instruction completes, the present invention sets a flag to note the occurrence of that condition; this flag is referred to as a context-synchronizing-required flag. When an ISYNC instruction completes, the present invention causes a flush and refetches the instructions after the ISYNC if the context-synchronizing-required flag is active. The present invention then resets the context-synchronizing-required flag. If the context-synchronizing-required flag is not active, then the present invention does not generate a flush operation. The present invention thus reduces the frequency of the flush action significantly, thus improving the performance of the processor.

Furthermore, the context-synchronizing-required flag is not set when the context-synchronizing-required instruction is dispatched. Instead, the flag is set when the corresponding instruction completes. This implementation solves the problem of speculative context-synchronizing-required instructions setting the context-synchronizing-required flag and then aborting.

Any type of register 290 could store the context-synchronizing-required flag (CSR flag) and be monitored by the flow diagram illustrated in FIG. 3 described below.

With respect to the present invention, a context-synchronizing-required instruction could be any one of the following, which are described in detail in the "*PowerPC Architecture: A Specification for a New Family of RISC Processors*" referenced previously:

icbi (instruction cache block invalidate): this instruction invalidates a block of instructions in the instruction cache.

mtmsr, mtmsrd (move to MSR and move to MSR double): move the content of a GPR to the MSR.

mtspr (move to SPR) ASR, SDR1, HID, MMCR, PMC, DABR, IABR, ACCR: move the content of a GPR to the SPR. In particular, the ASR, SDR1, HID, MMCR, PMC, DABR, IABR, and ACCR are specific SPRs that contain a special state of the machine. Changing them requires a context-synchronizing instruction.

slbie (invalidate segment lookaside table entry): invalidate a segment entry in the segment lookaside table.

tlbie (invalidate page lookaside table entry): invalidate a page entry in the page lookaside table.

mtsr, mtsrin (move to SR, move to SR indirect): move the content of a GPR to the SR.

Figure 3:
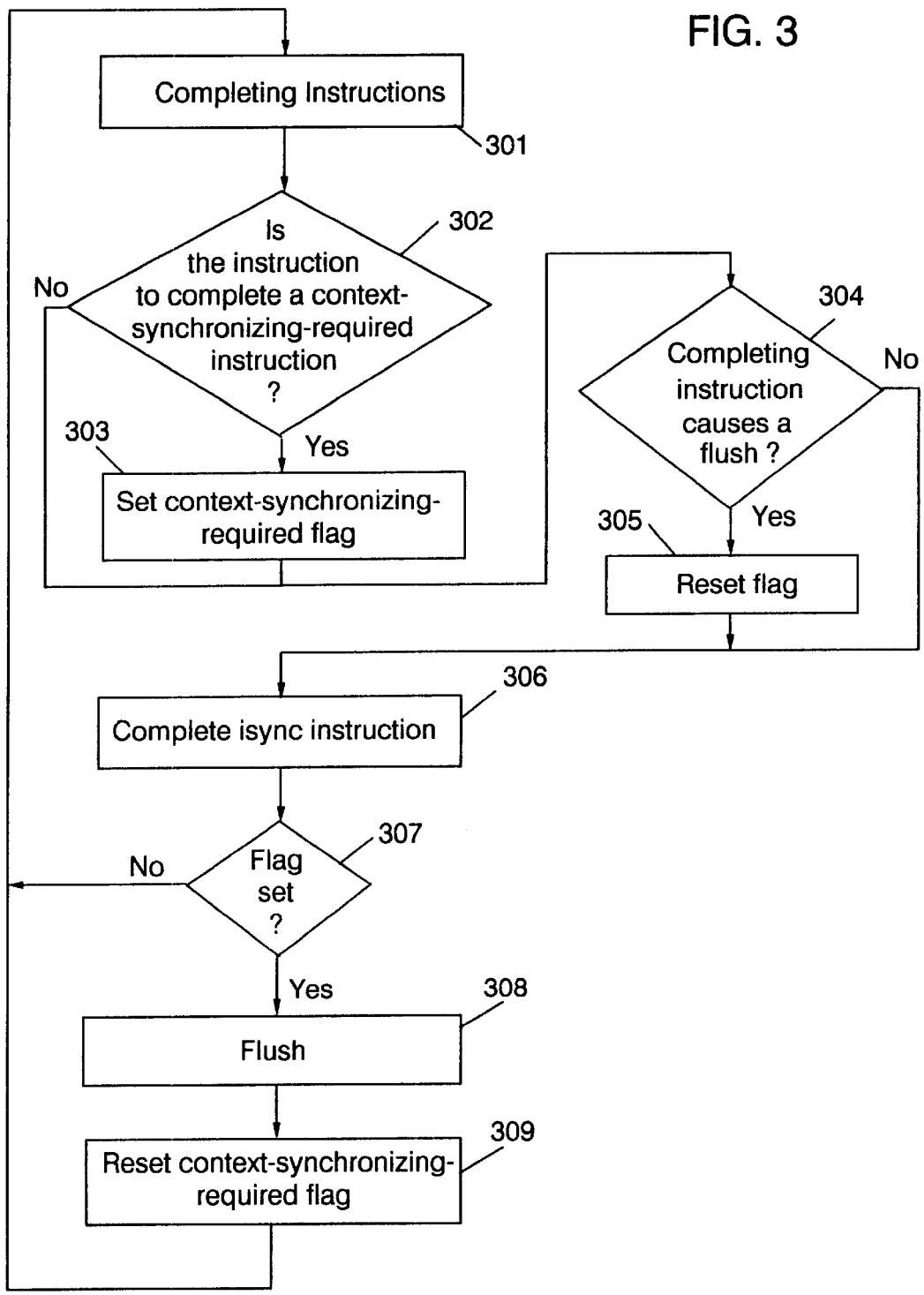
FIG. 3 illustrates a flow diagram of an embodiment of the present invention.

The present invention is described in further detail in FIG. 3. In step 301, instructions are completed using the completion unit 240. In step 302, a determination is made whether the instruction next to complete is a context-synchronizing-required instruction. If not, the process proceeds to step 304. However, if in step 302, the instruction next to complete is a context-synchronizing-required instruction, then the context-synchronizing-required flag is set in step 303. Several instructions may complete before or after the context-synchronizing-required instruction. However, for the sake of clarity, this is not further illustrated in FIG. 3.

The CSI flag can also be reset by a flush of completing instruction that is different than the ISYNC. This occurs for the following case:

CSI instruction completes (step 302), then set CSI flag (step 303), other instruction (not the ISYNC) completes which causes a flush (the instruction may require a flush itself or it encounters an interrupt condition) (step 304).

Since the flush operation occurs, the CSI is reset to prevent an unnecessary flush when the ISYNC is eventually refetched and completed. If a completing instruction does not cause a flush, the process merely proceeds from step 303 to step 306.

Thereafter, an ISYNC instruction will move down the completion unit pipeline to be completed in step 306. In step 307, the present invention determines if the context-synchronizing-required flag has been set. If yes, then in step 308, a flush is performed of all speculatively dispatched or fetched instructions after the ISYNC instruction. The instruction after the ISYNC is then refetched. Then in step 309, the context-synchronizing-required flag is cleared, or reset. The process then continues with the completion of the refetched instructions (step 301).

A novelty of the present invention is that when the context-synchronizing-required flag is not set when an ISYNC instruction is completed, the flush operation in step 308 is not performed. Instead, the process proceeds from step 307 to step 301 to the continuing of the completion of instructions. This implementation, as noted above, reduces the frequency of the flush action significantly improving the performance of the processor.

To ensure the order of larwx and subsequent load instructions, a scoreboard mechanism is implemented on the ISYNC instruction. The ISYNC instruction is held from being dispatched until all prior load instructions have executed. Note that the present invention chooses to hold the ISYNC instruction at the dispatch stage. Other implementations may decide to hold the ISYNC instruction at other stages as long as it ensures that the ISYNC instruction prevents subsequent load instructions from executing before prior load instructions have executed.

Although the present invention and its advantages have been described in detail, it should be understood that various changes, substitutions and alterations can be made herein without departing from the spirit and scope of the invention as defined by the appended claims.

What is claimed is:

1. A method for completing instructions comprising the steps of:
   determining if an instruction to complete is a context-synchronizing-required instruction;
   completing an isync instruction subsequent to completion of the instruction; and
   not flushing instructions fetched subsequent to the isync instruction if the instruction to complete is not a context-synchronizing-required instruction.

2. The method as recited in claim 1, further comprising the step of:
   flushing instructions fetched subsequent to the isync instruction if the instruction to complete is a context-synchronizing-required instruction.

3. The method as recited in claim 2, further comprising the step of:
   setting a context-synchronizing-required flag if the instruction to complete is a context-synchronizing-required instruction, wherein the flushing step is performed if the flag is set.

4. The method as recited in claim 3, further comprising the step of:
   resetting the context-synchronizing-required flag after the flushing step.

5. The method as recited in claim 4, further comprising the step of:
   if the instruction to complete causes a flush, resetting the flag.

6. The method as recited in claim 1, further comprising the step of:
   if the instruction to complete causes a flush, not flushing instructions fetched subsequent to the isync instruction.

7. A processor comprising:
   a fetcher operable for fetching instructions from memory;
   one or more execution units operable for executing the instructions;
   a dispatch unit operable for dispatching the instructions to the one or more execution units;
   a completion unit operable for completing executed instructions;
   circuitry operable for determining if an instruction in the completion unit is a context-synchronizing-required instruction;
   circuitry in the completion unit operable for completing an isync instruction subsequent to completion of the instruction; and
   circuitry operable for not flushing instructions fetched subsequent to the isync instruction if the instruction to complete is not a context-synchronizing-required instruction.

8. The processor as recited in claim 7, further comprising:
   circuitry operable for flushing instructions fetched subsequent to the isync instruction if the instruction to complete is a context-synchronizing-required instruction.

9. The processor as recited in claim 8, further comprising:
   a context-synchronizing-required flag; and
   circuitry operable for setting the context-synchronizing-required flag if the instruction to complete is a context-synchronizing-required instruction, wherein the flushing of the instructions is performed if the flag is set.

10. The processor as recited in claim 9, further comprising:
    circuitry operable for setting the context-synchronizing-required flag after the flushing of the instructions.

11. The processor as recited in claim 10, further comprising:
    if the instruction to complete causes a flush, circuitry operable for resetting the flag.

12. The processor as recited in claim 7, further comprising:
    if the instruction to complete causes a flush, circuitry operable for not flushing instructions fetched subsequent to the isync instruction.

13. A computer program product adaptable for storage on a computer readable medium, the computer program product operable for completing instructions comprising the program steps of:

determining if an instruction to complete is a context-synchronizing-required instruction;

completing an isync instruction subsequent to completion of the instruction; and not flushing instructions fetched subsequent to the isync instruction if the instruction to complete is not a context-synchronizing-required instruction.

14. The computer program product as recited in claim 13, further comprising the step of:

flushing instructions fetched subsequent to the isync instruction if the instruction to complete is a context-synchronizing-required instruction.

15. The computer program product as recited in claim 14, further comprising the program step of:

setting a context-synchronizing-required flag if the instruction to complete is a context-synchronizing-required instruction, wherein the flushing program step is performed if the flag is set.

16. The computer program product as recited in claim 15, further comprising the program step of:

resetting the context-synchronizing-required flag after the flushing program step.

17. The computer program product as recited in claim 16, further comprising the program step of:

if the instruction to complete causes a flush, resetting the flag.

18. The computer program product as recited in claim 13, further comprising the program step of:

if the instruction to complete causes a flush, not flushing instructions fetched subsequent to the isync instruction.

* * * * *

UNITED STATES PATENT AND TRADEMARK OFFICE
CERTIFICATE OF CORRECTION

PATENT NO. : 6,473,850 B1
DATED : October 29, 2002
INVENTOR(S) : Hoichi Cheong et al.

It is certified that error appears in the above-identified patent and that said Letters Patent is hereby corrected as shown below:

<u>Title page, Item [54] and Column 1, line 1,</u>
Please replace "SYSTEM AND METHOD FOR HANDLING INSTRUCTIONS OCCURRING AFTER AN ISYNC INSTRUCTION" with -- SYSTEM FOR SELECTIVELY FLUSHING INSTRUCTIONS WHICH FOLLOW AN ISYNC BARRIER INSTRUCTION IN PROGRAM ORDER --.

Signed and Sealed this

First Day of April, 2003

JAMES E. ROGAN
*Director of the United States Patent and Trademark Office*